US012036699B2

(12) United States Patent
Both et al.

(10) Patent No.: US 12,036,699 B2
(45) Date of Patent: Jul. 16, 2024

(54) MOBILE TWIN SHAFT MIXERS FORMED OF A FLEXIBLE SHEATH AND METHODS FOR USE THEREOF

(71) Applicant: RockSolid Concrete Products Inc., Athabasca (CA)

(72) Inventors: John Both, Athabasca (CA); Henry Neufeld, Clyde (CA)

(73) Assignee: RockSolid Concrete Products Inc., Athabasca (CA)

( * ) Notice: Subject to any disclaimer, the term of this patent is extended or adjusted under 35 U.S.C. 154(b) by 587 days.

(21) Appl. No.: 17/173,740

(22) Filed: Feb. 11, 2021

(65) Prior Publication Data

US 2021/0252741 A1 Aug. 19, 2021

Related U.S. Application Data

(60) Provisional application No. 62/976,484, filed on Feb. 14, 2020.

(51) Int. Cl.
*B28C 5/14* (2006.01)
*B28C 5/08* (2006.01)

(52) U.S. Cl.
CPC ............ *B28C 5/146* (2013.01); *B28C 5/0812* (2013.01); *B28C 5/0893* (2013.01); *B28C 5/142* (2013.01)

(58) Field of Classification Search
CPC ..... B28C 5/146; B28C 5/0812; B28C 5/0893; B28C 5/142; B28C 5/0862; B01F 27/702; B01F 35/451
See application file for complete search history.

(56) References Cited

U.S. PATENT DOCUMENTS

| | | | | | |
|---|---|---|---|---|---|
| 1,327,917 | A * | 1/1920 | Kellar | B28C 5/0862 | 366/47 |
| 1,555,964 | A * | 10/1925 | Guedel | B02C 13/2804 | 366/66 |
| 4,521,116 | A * | 6/1985 | Adsit | B01F 29/401 | 366/54 |
| 4,538,916 | A * | 9/1985 | Zimmerman | B28C 9/0463 | 366/186 |
| 5,441,341 | A * | 8/1995 | Halsted | B01F 35/50 | 220/645 |
| 2021/0252741 | A1* | 8/2021 | Both | B28C 5/142 | |

FOREIGN PATENT DOCUMENTS

| | | | | |
|---|---|---|---|---|
| DE | 10115313 | A1 * | 10/2002 | B01F 15/00837 |
| EP | 0241723 | A2 * | 10/1987 | |
| GB | 2159427 | A * | 12/1985 | B01F 15/0074 |

* cited by examiner

*Primary Examiner* — Charles Cooley
(74) *Attorney, Agent, or Firm* — Robert A. Nissen

(57) ABSTRACT

A method and apparatus for a mobile twin shaft mixer, which includes a mixing chamber formed of a flexible sheath and a frame formed of a rigid material. A benefit to the mobile twin shaft mixer can be a compact, lightweight, high capacity twin shaft mixer useful for mixing, proportioning, and transporting construction materials in mobile operations. A benefit to the methods of use of the mobile twin shaft mixer can be the supply of modern construction materials to the delivery location at the point of installation.

17 Claims, 8 Drawing Sheets

MOBILE TWIN SHAFT MIXERS FORMED OF A FLEXIBLE SHEATH AND METHODS FOR USE THEREOF

CROSS-REFERENCE TO RELATED APPLICATIONS

This application claims priority to U.S. Provisional Application No. 62/976,484, filed on Feb. 14, 2020, which is incorporated by reference in its entirety.

TECHNICAL FIELD

A mobile twin shaft mixer is disclosed herein, as well as methods of using the same. A benefit to the mobile twin shaft mixer can be a compact, lightweight, high capacity twin shaft mixer useful for mixing, proportioning, and transporting construction materials in mobile operations. A benefit to the methods of use of the mobile twin shaft mixer can be the rapid, continuous supply of modern construction materials to the delivery location at the point of installation.

BACKGROUND

The mixing of various construction materials together is a key process in preparing them for delivery and installation during construction operations. The construction materials are blended so as to distribute all components evenly into a homogeneous mixture. The mixing cycle should be completed as quickly as possible, while keeping costs for energy use and equipment wear as low as possible. Twin shaft mixing technology is a preferred choice for its ability to provide intense mixing of small and large batch sizes and for use in continuous ribbon type mixing. Currently available twin shaft mixers are very large and heavy, making them impractical for use in mobile operations, while current construction technology offers materials with faster curing times. There remains a need for mobile applications in the art for twin shaft mixers that can provide effective mixing of today's construction materials, both during mobile operations and for on-site delivery applications.

SUMMARY

Embodiments herein are directed to twin shaft mixers, compositions comprising the same, and related methods of mixing a curable composite.

In an aspect, the twin shaft mixer comprises a frame formed of a rigid material, wherein the frame includes a dual mixing support structure and a sheath support structure. In such embodiments, the twin shaft mixer includes two mixing shafts, wherein an entry end and an exit end of the mixing shafts are supported by the dual mixing support structure. In such embodiments, the twin shaft mixer includes a sheath formed of a flexible material, wherein the sheath includes a top portion and a bottom portion, and the sheath forms a mixing chamber around and along a length of the two mixing shafts; wherein the top portion and the bottom portion of the sheath are attached to the sheath support structure, and wherein the mixing shafts include at least one blade having an outer edge.

In an aspect, the two mixing shafts are connected to at least one power motor. In certain embodiments, the at least one power motor includes a hydraulic motor, a direct drive motor, a motor capable of providing from about 5,000 Watts to about 200,000 Watts, or a combination thereof.

In some embodiments, the rigid material includes steel. In some embodiments, the flexible material includes a fabric, a rubber material, a conveyor belt material, a multi-ply flexible material, a rubber material having a tensile strength of from about 5 MPa to about 1000 MPa, a rubber material having embedded fibers, or a combination thereof. In certain embodiments, the sheath has a thickness of from about 0.2 cm to about 2.5 cm.

In certain embodiments, the mixing chamber has a diameter of from about 45 cm to about 200 cm. In certain embodiments, the mixing chamber has a length of from about 125 cm to about 400 cm. In certain embodiments, a ratio of a shortest distance across the mixing chamber to a diameter of the mixing shafts ranges from about 3:1 to about 5:1. In certain embodiments, the twin shaft mixer further includes a clearance of from about 0.5 cm to about 20 cm between the outer edge of the at least one mixing blade and an inner surface of the sheath.

In an aspect, the sheath support structure includes at least two sheath attachment strips extending along a length of the frame, wherein each sheath attachment strip includes a plurality of sheath attachment points extending along a length of the sheath support structure. In certain embodiments, the top portion and the bottom portion of the sheath include sheath edges, wherein the sheath edges are reversibly attached to the plurality of sheath attachment points with fasteners.

In certain embodiments, the twin shaft mixer further includes a plurality of rib attachment points extending along the length of the sheath support structure, and a plurality of ribs formed of a rigid material having rib ends and extending along a width of the mixing chamber, wherein the rib ends are attached to the rib attachment points. In certain embodiments, the plurality of ribs have a clearance distance between the ribs and the top portion or the bottom portion of the sheath of from about 0.1 cm to about 20 cm. In certain embodiments, the ribs range in thickness from about 2 cm to about 20 cm and in width from about 0.1 cm to about 2.5 cm. In certain embodiments, the bottom portion of the sheath is divided into a left bottom section and a right bottom section along a length of the mixing chamber, wherein the rib ends are attached by a hinge to the sheath attachment strips.

In certain embodiments, the ribs are divided into two reversibly attached portions, and wherein the left bottom section and the right bottom section of the sheath include sheath edges reversibly attached to the rib portions. In certain embodiments, the ribs include an indentation along a length of the ribs to form a clearance of about 20 cm to about 0.1 cm between the mixing blade outer edges and an inner surface of the sheath.

In some aspects, the top sheath portion has a rounded shape. In certain embodiments, the sheath top portion is divided into a left top section and a right top section, and wherein the left top section and the right top section are reversibly secured to the frame on at least one end of the mixing chamber.

In certain embodiments, the frame further includes at least two frame support members extending along the length of the frame, and wherein at the least two sheath attachment strips include a hook portion attached to and extending along the length of the sheath attachment strip, wherein the hook portions are reversibly attachable to the at least two frame support members.

In some aspects, the frame further includes one or more attachment brackets. In certain embodiments wherein the twin shaft mixer is freestanding, the twin shaft mixer is mounted by the one or more attachment brackets to a vehicle. In certain embodiments, the twin shaft mixer is mounted to instillation equipment by the one or more attachment brackets. In certain embodiments, the twin shaft mixer is mounted on an intermediate machine, wherein the intermediate machine is attached to the vehicle and instillation equipment.

Embodiments herein are directed to methods of mixing a curable composite. In various embodiments, the method includes providing a twin shaft mixer, wherein the twin shaft mixer includes a frame formed of a rigid material, wherein the frame includes a dual mixing support structure and a sheath support structure; two mixing shafts, wherein an entry end and an exit end of the mixing shafts are supported by the dual mixing support structure; a sheath formed of a flexible material, wherein the sheath includes a top portion and a bottom portion, and the sheath forms a mixing chamber around and along a length of the two mixing shafts; wherein the top portion and the bottom portion of the sheath are attached to the sheath support structure, and wherein the mixing shafts include at least one blade having an outer edge.

In various embodiments, the method includes loading one or more components of a curable composite into an entry end of the twin shaft mixer; forming a curable composite by turning the two mixing shafts at a mixing shaft rotation speed; and dispensing the curable composite to a point of delivery.

In certain embodiments of methods herein, the mixing shaft rotation speed is from about 50 rpm to about 400 rpm. In certain embodiments, the method includes dispensing the curable composite at a dispensing rate of from about 10 metric tons per hour to about 500 metric tons per hour. In certain embodiments, the curable composite includes a cement composition, an asphalt composition, a cement composition having a slump of from about 0 cm to about 35 cm, a cement composition having an initial setting time of from about 5 minutes to about 200 minutes, or a combination thereof. In certain embodiments, the mixer is operated at an ambient temperature of from about −40 degrees C. to about 110 degrees C.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown. Unless otherwise noted, the drawings are not to scale.

FIG. 4A shows a schematic end view of an embodiment of a twin shaft mixer having reversible sheath and rib end hinge attachments and having both bottom sections detached.

DETAILED DESCRIPTION

Unless otherwise noted, all measurements are in standard metric units.

Unless otherwise noted, all instances of the words "a," "an," or "the" can refer to one or more than one of the word that they modify.

Unless otherwise noted, the phrase "at least one" means one or more than one of an object. For example, "at least one blade" means one blade, more than one blade, or any combination thereof.

Unless otherwise noted, the term "about" refers to +10% of the non-percentage number that is described, rounded to the nearest whole integer. For example, about 200 cm, would include 180 to 220 cm. Unless otherwise noted, the term "about" refers to +5% of a percentage number. For example, about 20% would include 15 to 25%. When the term "about" is discussed in terms of a range, then the term refers to the appropriate amount less than the lower limit and more than the upper limit. For example, from about 200 to about 400 cm would include from 180 to 440 cm.

Unless otherwise noted, properties (height, width, length, ratio etc.) as described herein are understood to be averaged measurements.

Unless otherwise noted, a "curable composite" or "curable composition" is a viscous material that solidifies when allowed to set or sit without agitation for a period of time. Examples of curable compositions include cement and asphalt.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

Embodiments of Twin Shaft Mixers

Figure 1A:
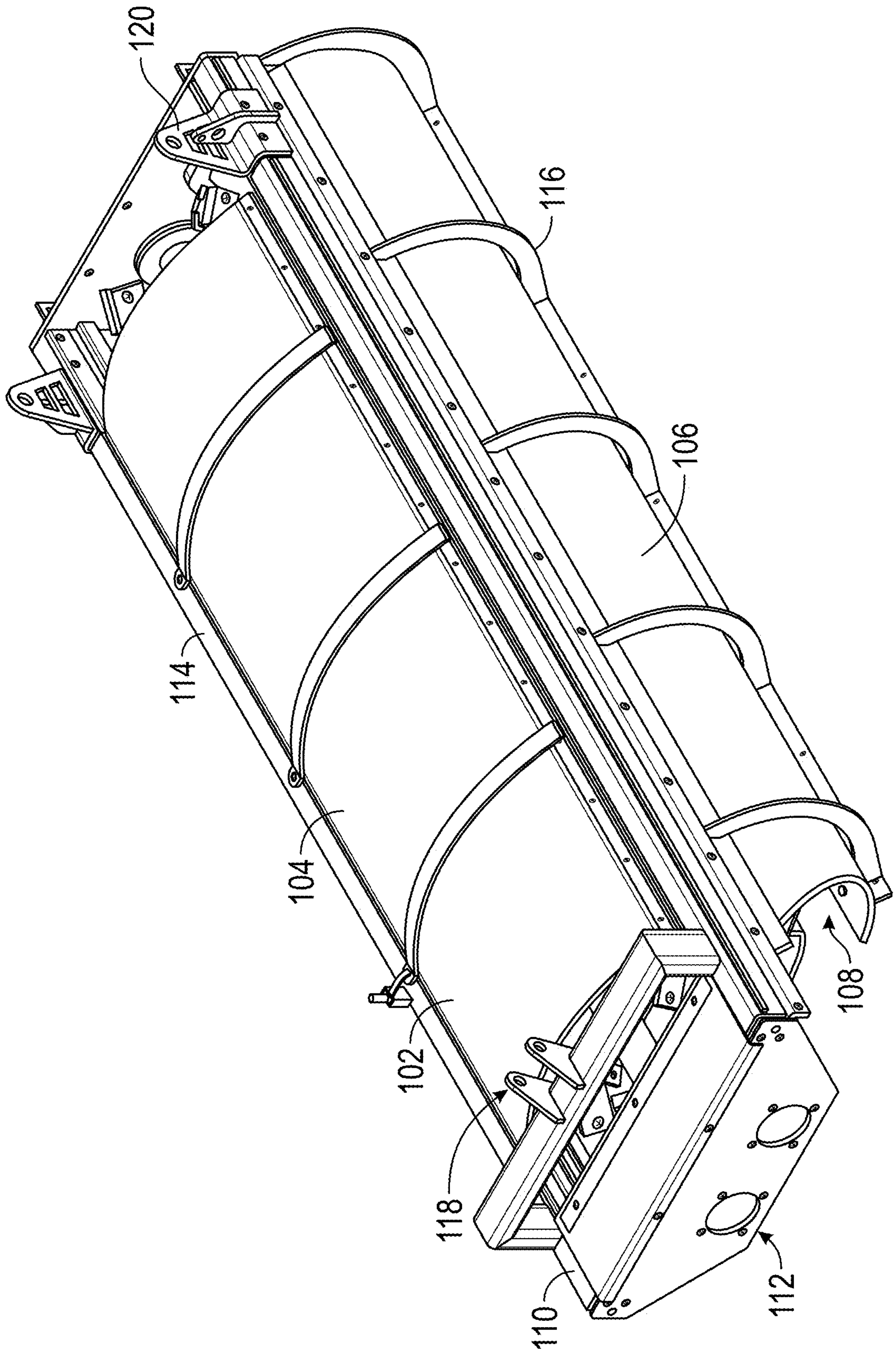
FIG. 1A shows a schematic top and side view of an embodiment of a twin shaft mixer.
Figure 1B:
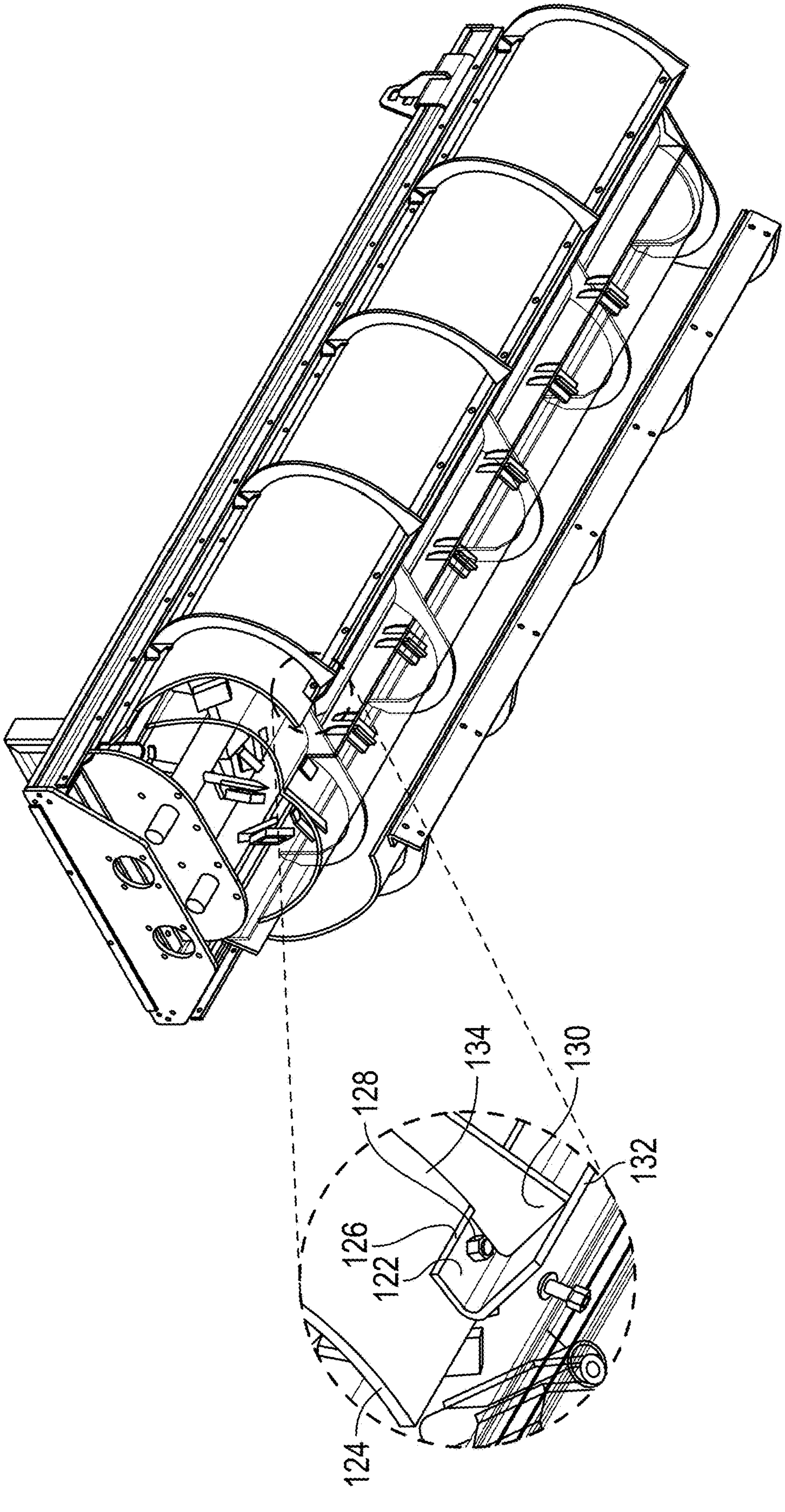
FIG. 1B shows a schematic bottom and side view of the embodiment of the twin shaft mixer in FIG. 1A and an expanded detail showing an embodiment of sheath and rib attachment points.
Figure 1C:
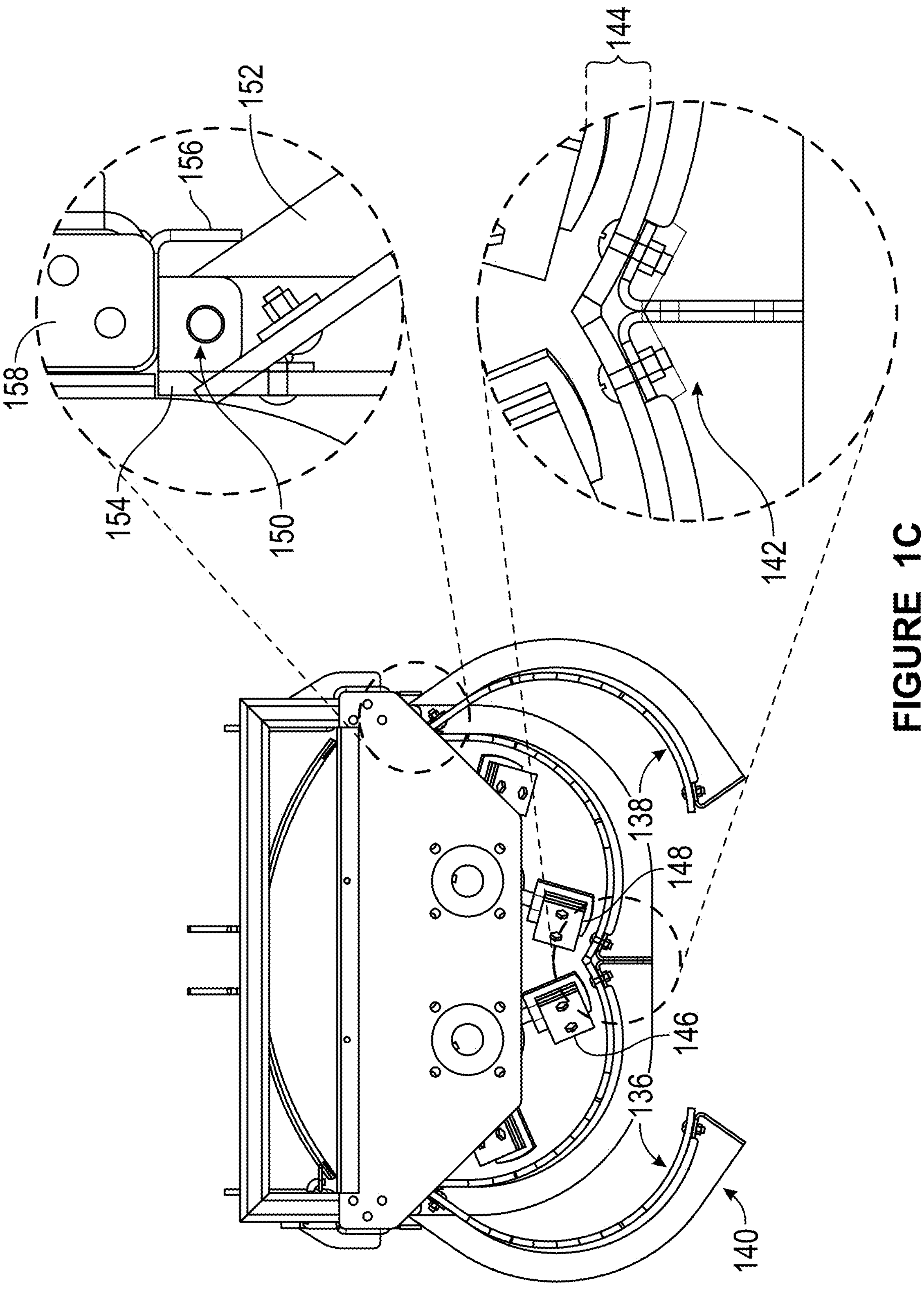
FIG. 1C shows a schematic end view of the embodiment of the twin shaft mixer in FIG. 1A as well as an expanded detail showing an embodiment of a hinge rib end attachment and an expanded detail showing an embodiment of an indentation.
Figure 1D:
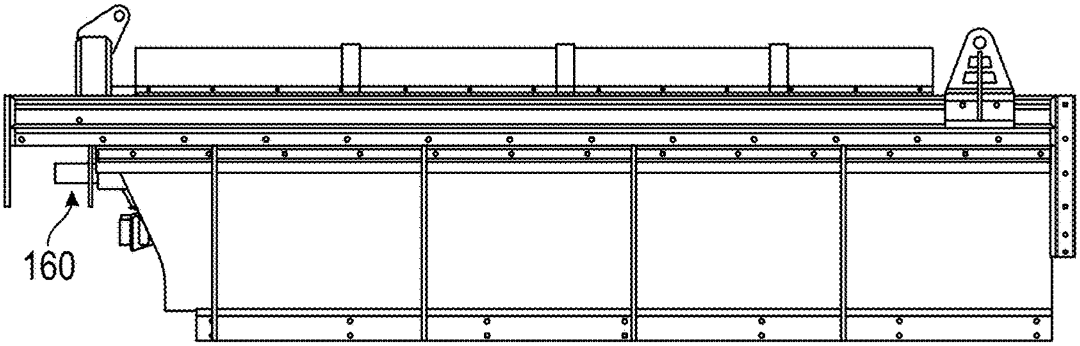
FIG. 1D shows a schematic side view of the embodiment of the twin shaft mixer in FIG. 1A.

Embodiments of twin shaft mixers are disclosed herein. Referring to FIG. 1A, sheath 102 having sheath top portion 104 and sheath bottom portion 106 forms mixing chamber 108 around and along a length of two mixing shafts (not shown), supported by frame 110 having dual mixing support structure 112. Sheath support structure 114 supports sheath 102 and includes ribs 116. Frame 110 includes sheath attachment clips 118 and attachment bracket 120. Referring to the expanded detail of FIG. 1B, sheath attachment strip 122 attaches sheath edge 124 to sheath attachment point 126 by fastener 128. Rib end 130 is attached to rib attachment point 132 with rib clearance 134 between the sheath and the rib. The twin shaft mixer end view in FIG. 1C shows left bottom sheath section 136 and right bottom sheath section 138 including rib portions 140 in an open configuration. Referring to the expanded detail including indentation 142 in FIG. 1C, indentation 142 shows left bottom sheath section 136 and right bottom sheath section 138 in a closed configuration, and forming shaft clearance 144 in a portion of the mixing chamber between blade outer edge 148 of blade 146 and an inner edge of sheath sections 136 and 138. Referring to expanded detail in FIG. 1C showing a hinge rib end attachment, hinge 150 attaches rib end 152 to sheath attachment strip 154, and hook portion 156 attaches frame support member 158 to sheath attachment strip 154. The side view of an embodiment of a twin shaft mixer in FIG. 1D shows mixing shaft 160 supported by dual mixing support structure 112.

Figure 2A:
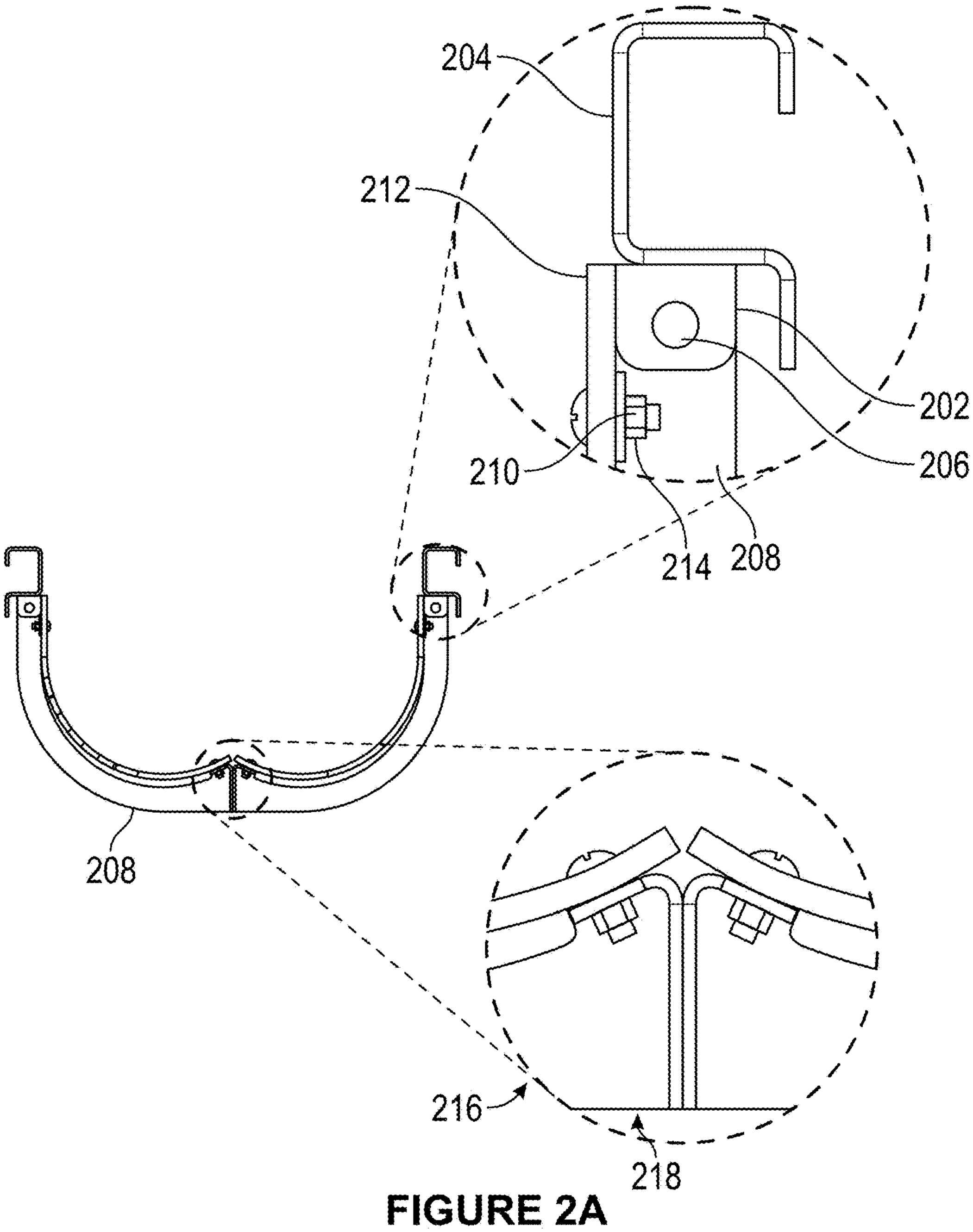
FIG. 2A shows a schematic end view of an embodiment of a sheath bottom portion, an expanded detail showing an embodiment of a sheath and rib attachment point, hinge and frame support member attachment, and an expanded detail showing an embodiment of an indentation.

An embodiment of a sheath bottom portion as disclosed herein is shown in FIG. 2A. Referring to the expanded detail in FIG. 2A showing an embodiment of a sheath and rib attachment point, hinge and frame support member attachment, sheath attachment strip 202 includes hook portion 204, hinge 206, rib portion 208, sheath attachment point 210, sheath edge 212, and fastener 214. Referring to the expanded detail in FIG. 2A showing an embodiment of an indentation, indentation 216 is formed by attached rib portions 218 in a closed configuration.

Figure 2B:
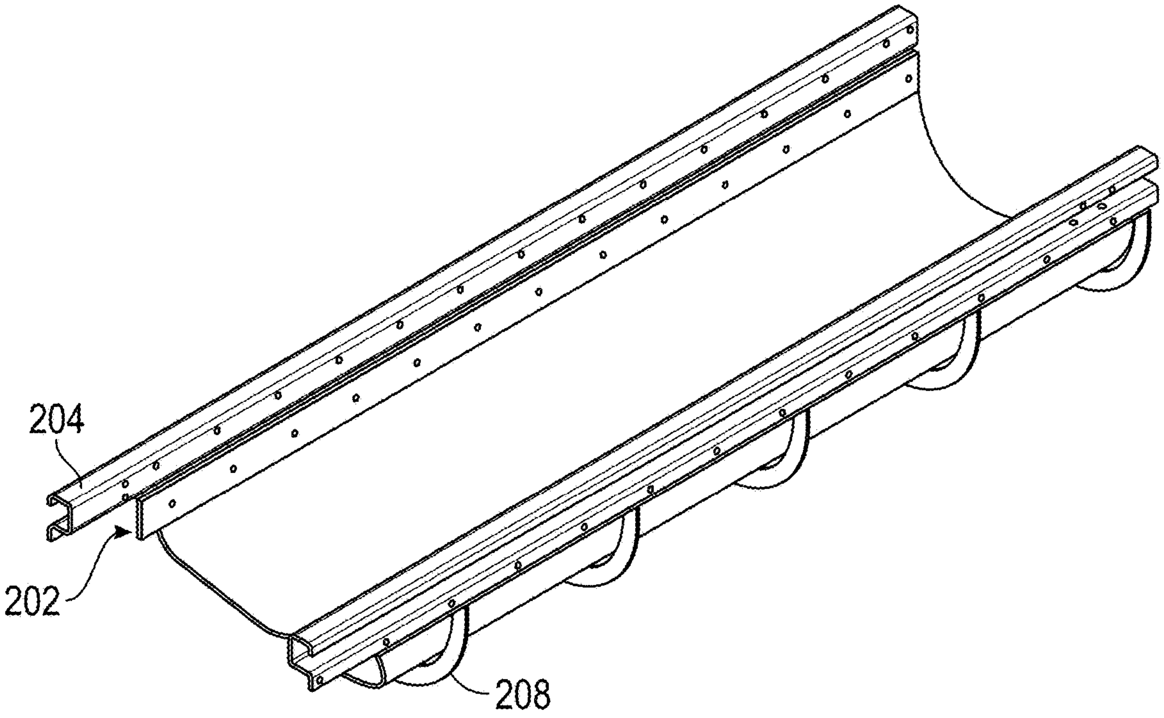
FIG. 2B shows a schematic top and side view of an embodiment of the sheath bottom portion of FIG. 2A.
Figure 2C:
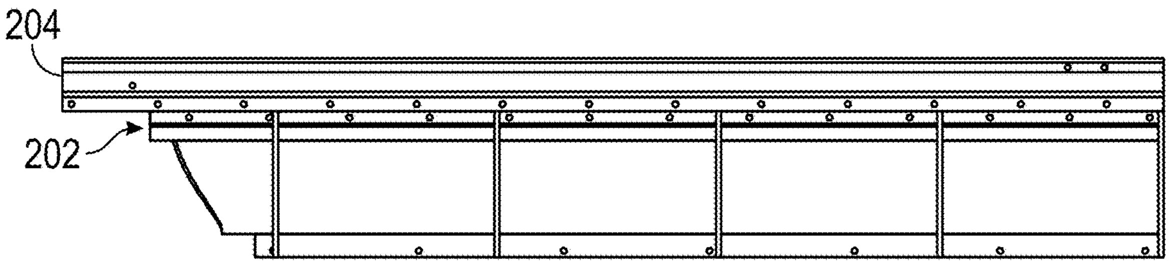
FIG. 2C shows a schematic side view of an embodiment of the sheath bottom portion of FIG. 2A.

An embodiment of a sheath bottom portion as disclosed herein is shown in FIG. 2B including sheath attachment strip 202, hook portion 204, and rib portion 208. An embodiment of a sheath bottom portion shown in FIG. 2C shows sheath attachment strip 202 and hook portion 204.

Figure 3A:
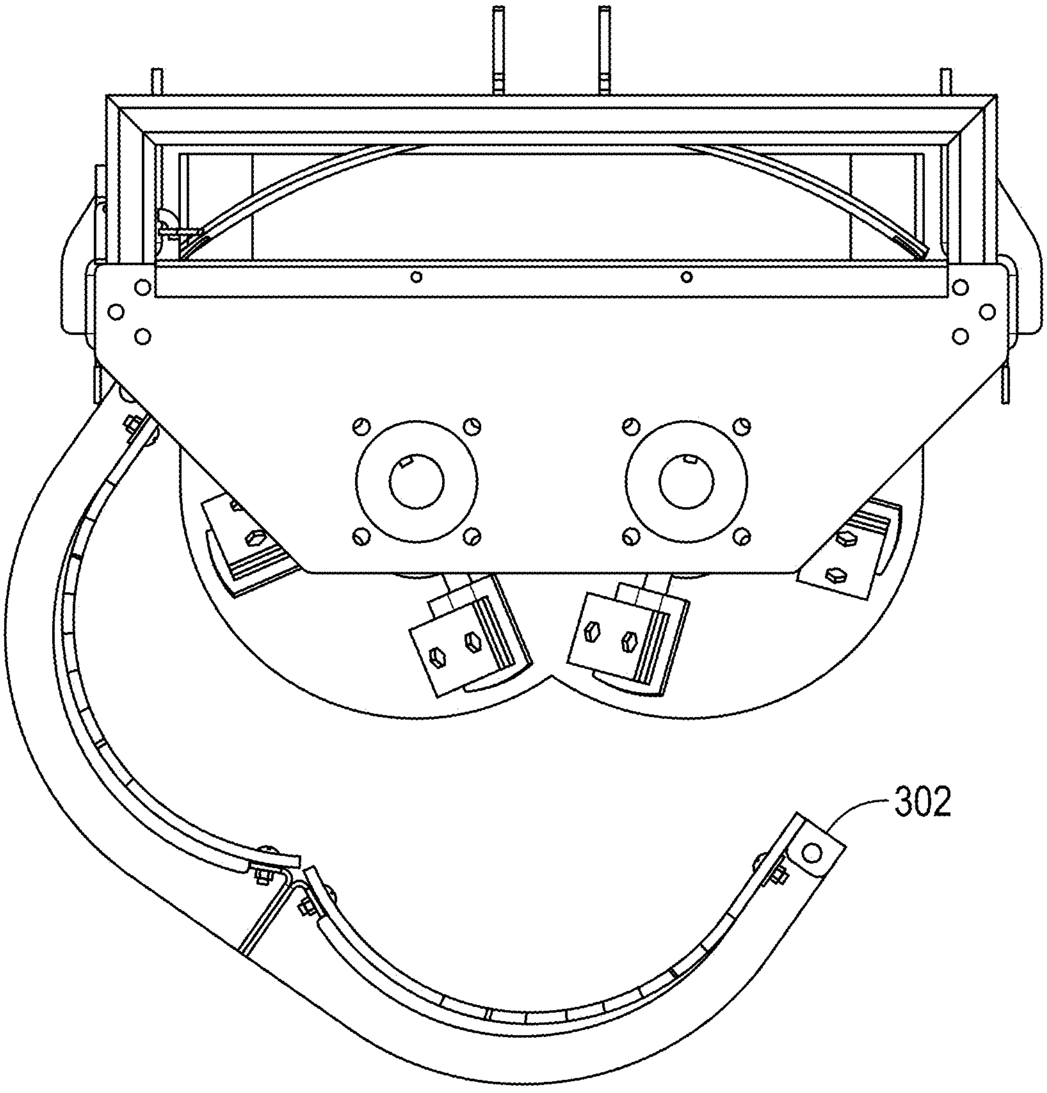
FIG. 3A shows a schematic end view of an embodiment of a twin shaft mixer having a reversible sheath and rib end hinge attachment and having one bottom section detached.
Figure 3B:
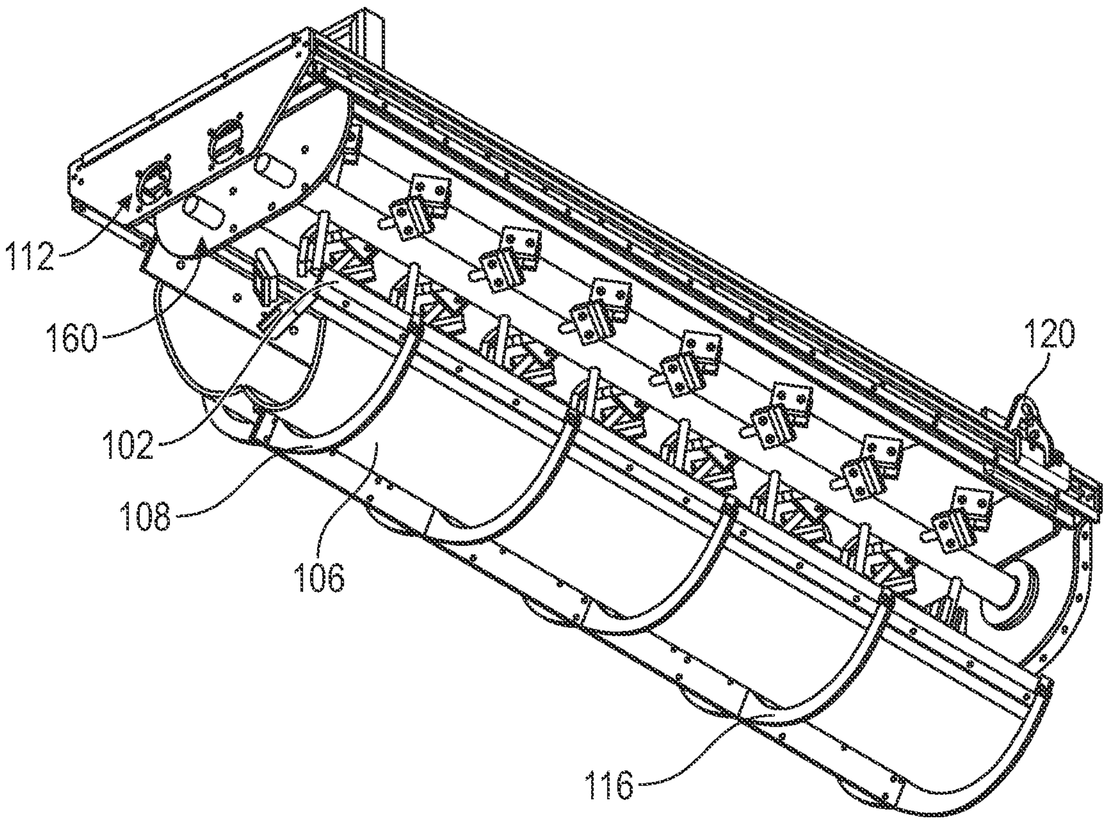
FIG. 3B shows a schematic bottom and side view of an embodiment of the twin shaft mixer of FIG. 3A having a reversible sheath and rib end hinge attachment and having one bottom section detached.
Figure 3C:
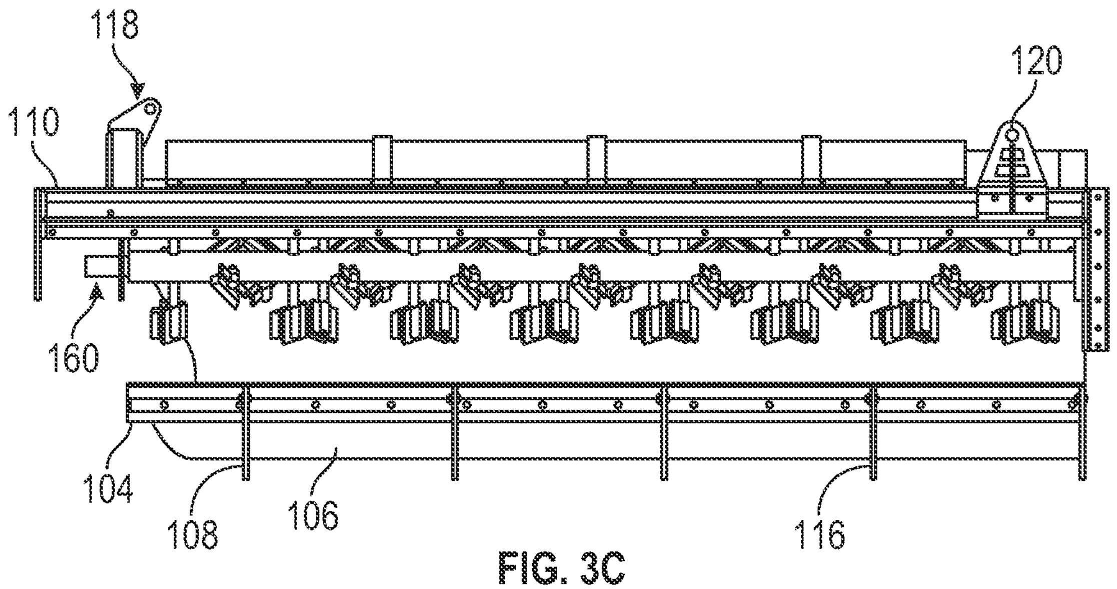
FIG. 3C shows a schematic side view of an embodiment of the twin shaft mixer of FIG. 3A having a reversible sheath and rib end hinge attachment and having one bottom section detached.

Referring to FIG. 3A, an embodiment of a twin shaft mixer as disclosed herein shows a reversible sheath and rib end hinge attachment 302 having one bottom section detached. FIG. 3B shows an embodiment of a twin shaft mixer having a reversible sheath and rib end hinge attachment and having one bottom section detached. FIG. 3C shows an embodiment of a twin shaft mixer having a reversible sheath and rib end hinge attachment and having one bottom section detached.

Figure 4B:
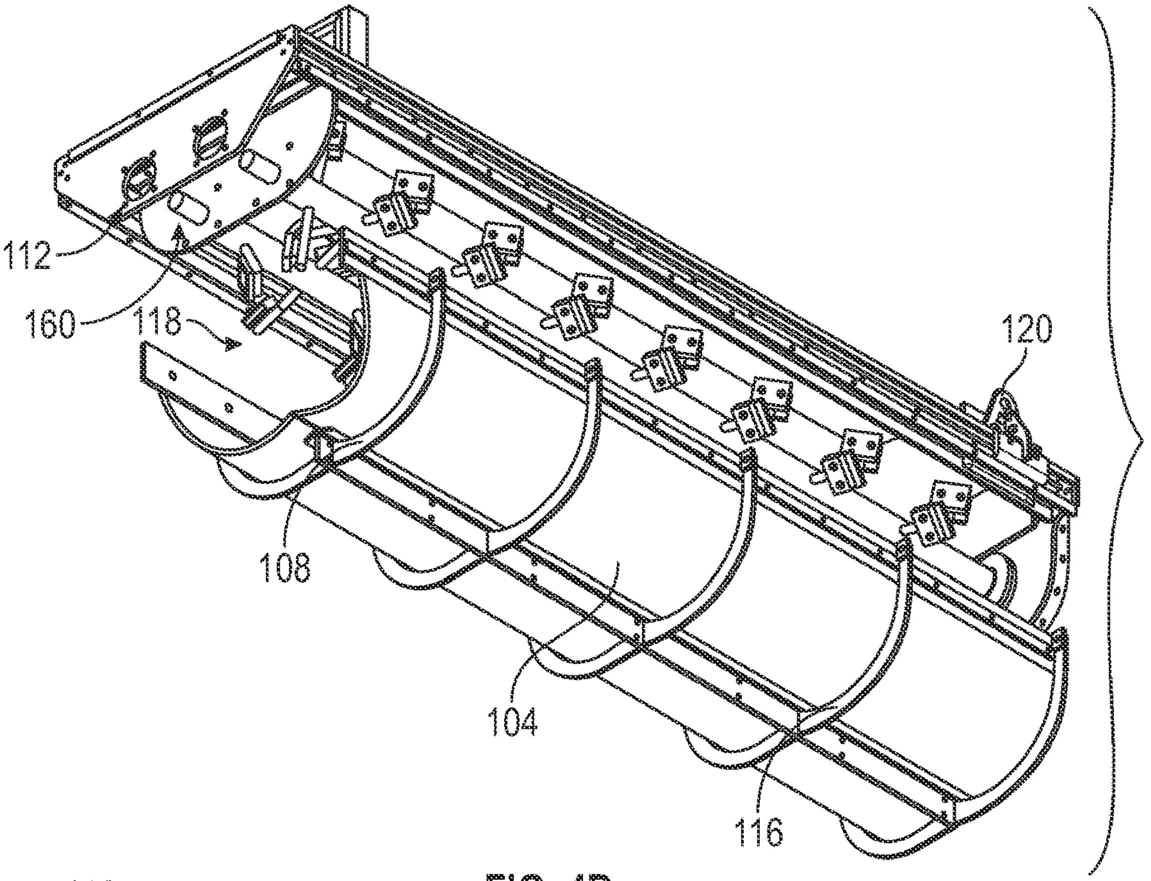
FIG. 4B shows a schematic bottom and side view of an embodiment of the twin shaft mixer of FIG. 4A having reversible sheath and rib end hinge attachments and having both bottom sections detached.
Figure 4C:
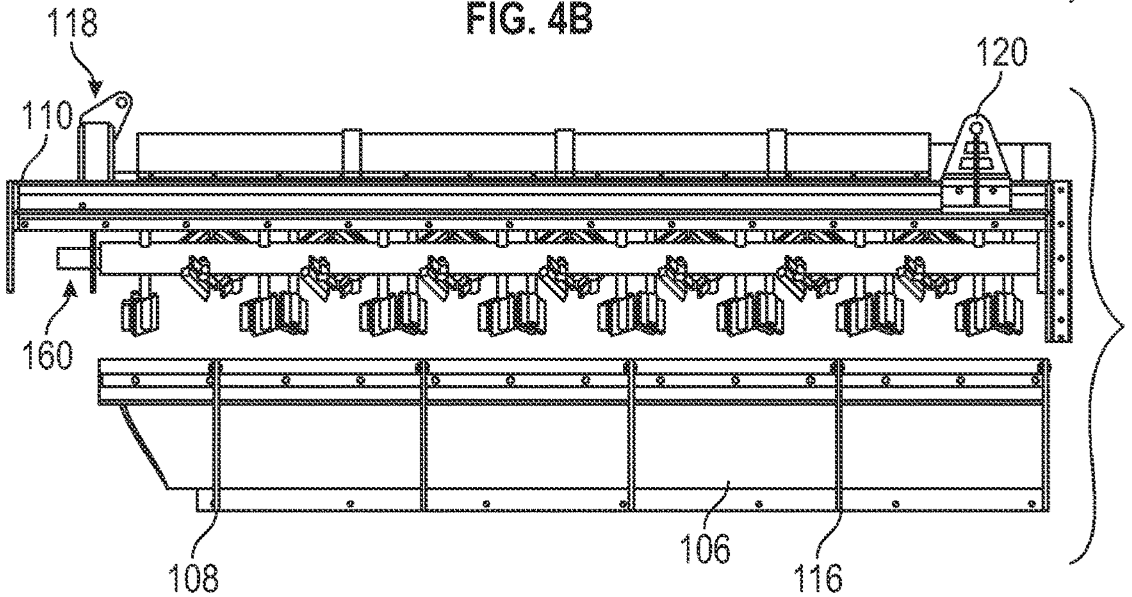
FIG. 4C shows a schematic side view of an embodiment of the twin shaft mixer of FIG. 4A having reversible sheath and rib end hinge attachments and having both bottom sections detached.

FIG. 4A shows an embodiment of a twin shaft mixer having reversible sheath and rib end hinge attachments 402 and 404 and having both bottom sections detached. FIG. 4B shows an embodiment of a twin shaft mixer having reversible sheath and rib end hinge attachments and having both bottom sections detached. FIG. 4C shows an embodiment of a twin shaft mixer having reversible sheath and rib end hinge attachments and having both bottom sections detached.

Figure 5:
FIG. 5 shows a flow chart depicting an embodiment of a method of mixing a curable composite.

An embodiment of a method of mixing a curable composite is disclosed herein. Referring to FIG. 5, an embodiment of a method as disclosed herein includes providing a twin shaft mixer according to embodiments herein 502; loading one or more components of a curable composite into an entry end of the twin shaft mixer 504; forming a curable composite by turning the two mixing shafts of the twin shaft mixer at a mixing shaft rotation speed 506; and dispensing the curable composite to a point of delivery 508.

The proper combination of various construction materials together into a homogeneous mixture is a crucial step to prepare for instillation of the mixture at the construction or building delivery site. Selecting the best mixing technology is essential for the most efficient use of valuable raw materials, and to achieve the best quality product. Twin-shaft mixing is a technology of choice for construction operations. Conventional twin shaft mixers have mixing blades on both mixing shafts that are arranged in an interrupted spiral pattern along the shafts, creating a constant rotation of materials in the mixing trough in an intense three-dimensional movement of the materials. The intense mixing allows the mixing cycle to be completed more quickly, helping to lower material particle stress, as well as the costs of energy usage and equipment wear. Conventional twin shaft mixing technology is preferred for material blending because it provides intense mixing of various materials in a continuous ribbon type process. However, traditional twin shaft mixers have large, heavy, inflexible chambers requiring heavy and bulky support frames, in order to facilitate the torque and wear of the mixing process, and to withstand the outward forces and internal pressures generated by mixing the materials together. The size and weight of conventional twin shaft mixers renders them impractical for use in mobile operations, because the size and weight would be impractical for stored transportation and deployment on site when attached to a delivery truck. Large support points and unwieldy lifting and moving components would also be necessary, making attachment to a mobile platform impractical.

Conventional twin shaft mixing is a requirement for handling large volumes of highly viscous or low slump materials, or large volumes of less viscous higher slump materials. Historically, twin shaft mixing has been used in centralized portable or permanent applications, where the desired raw materials are mixed and then loaded onto specialized mixing trucks, where the materials are subjected to constant mixing during delivery, or the materials are loaded onto regular delivery trucks and then unloaded as soon as possible. This conventional central mixing and delivery system is inefficient and expensive when it works correctly, because the curable compositions, such as cement, are perishable, thus reducing the available time to deliver and install them. For this reason, twin shaft mixers must be cleaned at least daily, because a layer of cement forms on the blades and the mixing chamber during operation. These layers tend to make mixing less efficient. The materials being blended are often erosive as well. Conventional mixers rely on more resistant materials, yet all the materials in the mixer are subject to wear and require replacing at intervals relative to the abrasiveness of the materials being blended. The result is that conventional mixing chambers must be replaced regularly, even when the process works as intended.

The process of centralized conventional twin shaft mixers is inefficient when the process works as intended. It can be disastrous when something goes wrong at the delivery location. For example, a mixing truck mixing a conventional slow setting composition, such as ordinary Portland concrete, has a maximum of about 90 minutes to travel from the mixing site to a remote construction site, and unload the material while agitating the composition the entire time. If the mixing truck gets stuck in traffic, then the entire load of concrete in the mixing drum of the truck can perish, resulting in the loss of the load of concrete. If the engine on the truck stops and cannot be restarted, the mixing drum can need to be replaced. A different sort of disaster occurs when mixing truck drivers are pressured to drive quickly and aggressively to make it to the construction site in time, leading to horrific traffic accidents because of the top heavy nature of the drum type mixing trucks.

If that wasn't challenging enough, the construction industry is under tremendous pressure to adopt new, faster construction methods and to have more durable, longer lasting materials. When materials are delivered over even short distances, the amount of time to install perishable materials is reduced; this negatively impacts the final quality of the materials. This negative effect is amplified if ambient conditions are unfavorable for the materials. New cementitious materials that set faster are being introduced to the marketplace. However, these faster setting materials have one major drawback: they allow far less time for blending and delivery, as compared, for example, to ordinary Portland cement concrete, and to provide sufficient time to practically install such materials. Construction businesses face a dilemma. They can either miss out on new construction projects because they cannot use the faster setting materials, or they can risk using these faster setting materials along with the higher cost of cleaning and replacing conventional mixers, and face the higher risk of disastrously losing the mixing drum of a mixing truck due to premature solidification or causing a traffic accident.

Embodiments of the present disclosure can provide a solution to this risky, costly dilemma. Embodiments herein can provide a solution to these challenges by providing a high capacity twin shaft mixer that is smaller, lighter in weight, and easier to maintain than currently available designs, yet that is able to accomplish the same or better results as the larger, heavier, more difficult to maintain mixers. Such twin shaft mixers as disclosed herein can also provide a benefit of making mobile applications practical for twin shaft mixers, by attaching the more compact and lighter twin shaft mixer of embodiments herein to a mobile proportioning system to provide high production rates with mobile continuous operations. One benefit of a twin shaft mixer capable of being easily transported to the construction site can be that materials can be mixed and dispensed on-site, which avoids the need to risk the loss of perishable loads of materials, and the potential loss of mixing drums and causing traffic accidents. One benefit of a mobile or portable twin shaft mixer can be that even the most advanced and fastest setting materials, such as cementitious materials can be used, resulting in superior construction materials and construction methods.

A twin shaft mixer is disclosed herein. In various embodiments, the twin shaft mixer includes a frame formed of a rigid material. In certain embodiments, the rigid material includes steel, alloys, and fiber reinforced materials. In various embodiments, the frame includes a dual mixing support structure and a sheath support structure. In such embodiments, the dual mixing support structure supports two mixing shafts, wherein the two mixing shafts each include an entry end and an exit end that are supported by the dual mixing support structure. In certain embodiments, the dual mixing support structure of the frame supports bearings for the two mixing shafts. In various embodiments, the two mixing shafts each include at least one blade having an outer edge. In some embodiments, the two mixing shafts can include two parallel counter-rotating mixing shafts. In some embodiments, the mixing shafts can be equipped with abrasion resistance wear paddles.

In certain embodiments, the two mixing shafts are connected to at least one power motor, which in certain embodiments can include a hydraulic motor, a direct drive motor, a motor capable of providing from about 5,000 Watts to about 200,000 Watts, or a combination thereof. In certain embodiments, the at least one power motor is capable of providing from about 15,000 Watts to about 175,000 Watts. In certain embodiments, the at least one power motor is capable of providing from about 30,000 Watts to about 150,000 Watts. In certain embodiments, the at least one power motor is capable of providing from about 45,000 Watts to about 125,000 Watts. In certain embodiments, the at least one motor can be supported by the dual mixing support structure. In certain embodiments, a gear box can be used in connection the at least one motor. A direct drive motor in some embodiments can provide benefits of reducing the overall weight of the twin shaft mixer, including in some embodiments by eliminating a gear box, and allowing increased mixing shaft speeds.

Various embodiments of a twin shaft mixer include a sheath formed of a flexible material, wherein the sheath includes a top portion and a bottom portion. Various embodiments of a twin shaft mixer include a sheath formed of a flexible material, wherein the sheath includes a semi-rigid or flexible top portion and a semi-rigid or flexible bottom portion. In various embodiments, the top portion and the bottom portion of the sheath are reversibly or irreversibly attached to the sheath support structure of the frame. In such embodiments, the sheath forms a mixing chamber around and along a length of the two mixing shafts. In such embodiments, the frame is integrated into the structural components of the twin shaft mixer, providing a frame and in turn a twin shaft mixer having benefits of being more compact in size and lighter in weight than the conventional twin shaft mixer designs.

Embodiments of Sheaths and Mixing Chambers

Various embodiments of a twin shaft mixer herein include a sheath formed of a flexible material or at least partially formed of a flexible material. In certain embodiments, the sheath includes a top portion and a bottom portion. In certain embodiments, the sheath top portion, the sheath bottom portion, or a combination thereof, are formed from a flexible material. In certain embodiments, sheath top portion is formed from a flexible material and the sheath top portion is formed of a flexible, semi-flexible, or rigid material. In certain embodiments, the flexible material includes a fabric, a rubber material, a conveyor belt material, a multi-ply flexible material, a rubber material having a tensile strength of from about 5 MPa to about 1000 MPa, a rubber material having embedded fibers, or a combination thereof. In an embodiment, the flexible material includes a rubber-like compound having lateral fibers. Embedded fibers in the flexible material can provide a benefit of greater tensile strength and durability to the sheath. In certain embodiments, the flexible material includes a rubber material having a tensile strength of from about 200 MPa to about 800 MPa; in certain embodiments, the flexible material includes a rubber material having a tensile strength of from about 400 MPa to about 600 MPa. Embodiments of a sheath formed of a flexible material can provide a benefit of a flexible mixing chamber that is not rigid, and yet has a high tensile strength. Such a flexible mixing chamber can provide a benefit of allowing movement of the sheath, and thus allow movement of a construction material or curable composite material. Such movement can provide advantages of more efficient, continuous, and thorough mixing of the materials within the mixing chamber. Embodiments of a twin shaft mixer having a sheath formed of a flexible material can include easier cleaning because the materials can be removed and cleaned on a flat surface such as a floor or table. Embodiments of a twin shaft mixer having a sheath formed of a flexible material can include lower cost replacement, because many flexible materials, such as rubber, are less costly than rigid materials, such as stainless-steel.

In various embodiments of a twin shaft mixer, the sheath top portion and the sheath bottom portion are reversibly or irreversibly attached to the sheath support structure. The sheath support structure can provide a benefit of supporting the flexible sheath in the correct shape while the mixing chamber is in use. In an embodiment, the sheath support structure includes a molded angle rigid material supported from the frame and supporting the sheath top portion and the sheath bottom portion. The sheath support structure can also provide a benefit of allowing the flexible sheath to move as construction material flows between the mixing chamber and the mixing shafts, while maintaining the overall relative size and shape of the mixing chamber formed by the sheath. Such embodiments can also provide a benefit of helping to ensure that a minimum of construction material exists between the bottom portion of the sheath and the rotating mixing shafts to allow effective mixing. Embodiments including a reversible attachment of the sheath to the sheath support structure can also provide a benefit of the facilitation of removal of the sheath from the sheath support structure for cleaning, replacement, or repair of one or more portions of the sheath or the sheath support structure.

In some embodiments, the top sheath portion has a rounded shape. Such embodiments can provide a benefit of increased volume capacity in the mixing chamber formed by the sheath, without increasing the width or length of the mixing chamber, thus adding to the compactness of such embodiments. In such embodiments, the rounded shape of the top sheath portion has a radius that is small enough to reflect construction materials toward the center of the mixing chamber as they are accelerated at the top of the mixing chamber, facilitating more effective mixing.

In some embodiments, the sheath top portion is divided into a left top section and a right top section; in certain embodiments, the left top section and the right top section are reversibly secured to the frame on at least one end of the mixing chamber. In certain embodiments, the left top section and the right top section can be reversibly secured to the frame by one or more suitable fasteners, which can include but are not limited to clips, bolts, or combinations thereof. Such embodiments can provide benefits of easier cleaning, repair, or replacement of one or more portions of the sheath by making the sheath removeable and capable of being moved into an open position. In certain embodiments, the sheath has a thickness of from about 0.2 cm to about 2.5 cm. In certain embodiments, the sheath has a thickness of from about 0.5 cm to about 2.0 cm. In certain embodiments, the sheath has a thickness of from about 1.0 cm to about 1.5 cm. Embodiments of a sheath formed of a flexible material can provide a benefit not only of a mixing chamber with flexibility of movement and wear resistance to the forces of mixing materials in the mixing chamber, but can also provide a benefit of compact size and lighter weight due to the embodiments of thicknesses of the flexible material that can be used.

Various embodiments of the twin shaft mixer include a mixing chamber formed by the sheath around and along a length of the two mixing shafts. In certain embodiments, the mixing chamber has a diameter of from about 40 cm to about 200 cm. In certain embodiments, the mixing chamber has a diameter of from about 50 cm to about 180 cm. In certain embodiments, the mixing chamber has a diameter of from about 60 cm to about 160 cm. In certain embodiments, the mixing chamber has a length of from about 125 cm to about 400 cm. In certain embodiments, the mixing chamber has a length of from about 150 cm to about 350 cm. In certain embodiments, the mixing chamber has a length of from about 175 cm to about 320 cm. In some embodiments, a ratio of a shortest distance across the mixing chamber to a diameter of the mixing shafts ranges from about 3:1 to about 5:1. In some embodiments, a ratio of a shortest distance across the mixing chamber to a diameter of the mixing shafts ranges from about 3.3:1 to about 4.7:1. In some embodiments, a ratio of a shortest distance across the mixing chamber to a diameter of the mixing shafts ranges from about 3.5:1 to about 4.5:1. In some embodiments, the twin shaft mixer further includes a clearance of from about 0.5 cm to about 20 cm between the outer edge of the at least one mixing blade and an inner surface of the sheath. In some embodiments, the twin shaft mixer further includes a clearance of from about 1 cm to about 15 cm between the outer edge of the at least one mixing blade and an inner surface of the sheath. In some embodiments, the twin shaft mixer further includes a clearance of from about 2 cm to about 10 cm between the outer edge of the at least one mixing blade and an inner surface of the sheath. In various embodiments, such a clearance in a suitable dimension range can provide a benefit of effective mixing of construction materials in the mixing chamber, while allowing for a sufficient flow of construction material between the at least one mixing blade and an inner surface of the sheath.

Embodiments of Sheath Support Structures

Certain embodiments of sheath support structures herein include at least two support frame components that are used as sheath attachment strips extending along a length of the frame of the twin shaft mixer, wherein each sheath attachment strip includes a plurality of sheath attachment points extending along a length of the sheath support structure. In some embodiments, the top portion and the bottom portion of the sheath include sheath edges, wherein the sheath edges are reversibly attached to the plurality of sheath attachment points with fasteners. Fasteners in various embodiments can include any of a variety of suitable fasteners for reversible attachment of the sheath edges, including but not limited to metal fasteners, bolts, screws, and nuts. In such embodiments, the plurality of sheath attachment points can be strategically positioned to the frame to support the attached sheath in a configuration to attain the desired shape of the mixing chamber formed by the sheath, and having the desired degree of flexibility in the sheath material. Placement of the sheath attachment points in such embodiments can also provide a benefit of easier removal of one or more portions of the sheath for cleaning, repair, or replacement.

Embodiments of the twin shaft mixer herein include a plurality of rib attachment points extending along the length of the sheath support structure, and a plurality of ribs extending along a width of the mixing chamber. In such embodiments, the plurality of ribs include rib ends attached to the rib attachment points. In certain embodiments, the ribs are formed of a rigid material, which in some embodiments can include steel or molded angle steel. Embodiments including a plurality of ribs in the sheath support structure can provide a benefit of allowing the flexible sheath to move as construction material flows between the mixing chamber and the mixing shafts, while maintaining the overall size and shape of the mixing chamber formed by the sheath. In certain embodiments, the plurality of ribs have a clearance distance between the ribs and the top portion or the bottom portion of the sheath of from about 0.1 cm to about 20 cm. In certain embodiments, the plurality of ribs has a rib clearance or clearance distance between the ribs and the top portion of the bottom portion of the sheath of from about 0.25 cm to about 15 cm. In certain embodiments, the plurality of ribs has a clearance distance between the ribs and the top portion of the bottom portion of the sheath of from about 0.5 cm to about 12 cm. If the rib clearance goes below 0.1 cm, then the sheath may be damaged as the materials being mixed press the sheath against the rib.

In certain embodiments, the ribs range in thickness from about 2 cm to about 20 cm. In certain embodiments, the ribs range in thickness from about 2.5 cm to about 18 cm. In certain embodiments, the ribs range in thickness from about 3 cm to about 16 cm. In certain embodiments, the ribs range in width from about 0.1 cm to about 2.5 cm. In certain embodiments, the ribs range in width from about 0.15 cm to about 2.0 cm. In certain embodiments, the ribs range in width from about 0.2 cm to about 1.5 cm.

In some embodiments, the bottom portion of the sheath is divided into a left bottom section and a right bottom section along a length of the mixing chamber. In such embodiments, the rib ends can be attached by a hinge to a sheath attachment strip. In another embodiment, the ribs are divided into two reversibly attached portions. In some embodiments, the left bottom section and the right bottom section of the sheath include sheath edges reversibly attached to the rib portions. In such embodiments, the bottom portion of the sheath and the reversibly attached portions of the sheath support structure can be opened. Such embodiments can provide a benefit of easy access to the interior of the mixing chamber for cleaning, replacement, or repair of one or more portions of the sheath. In other embodiments, the ribs include an indentation along a length of the ribs to form a clearance or shaft clearance of about 20 cm to about 0.1 cm between the mixing blade outer edges and an inner surface of the sheath. In certain embodiments, the indentation along a length of the ribs forms a clearance of about 15 cm to about 0.2 cm between the mixing blade outer edges and an inner surface of the sheath. In certain embodiments, the indentation along a length of the ribs forms a clearance of about 10 cm to about 0.3 cm between the mixing blade outer edges and an inner surface of the sheath. Such embodiments can provide a benefit of shaping the mixing chamber relative to the mixing blade outer edges for a more effective mixing of construction materials in the mixing chamber, while allowing for a sufficient flow of construction material between the at least one mixing blade and an inner surface of the sheath. If the clearance between the at least one mixing blade and an inner surface of the sheath falls below 0.1 cm, then the sheath may be damaged, or the mixed material may not be able to move efficiently through the mixing chamber. If the minimum shaft clearance passes above 20 cm, then the material near the sheath may not be mixed effectively, resulting in inhomogeneous mixtures and premature solidification of the material against the sheath surface.

In certain embodiments, the frame includes at least two frame support members extending along the length of the frame, wherein the at least two sheath attachment strips include a hook portion attached to and extending along the length of the sheath attachment strip. In such embodiments, the hook portions are reversibly attachable to the at least two frame support members. Such embodiments can facilitate the attachment of the twin shaft mixer to additional structures.

Embodiments of Frame Attachment Brackets

In certain embodiments of a twin shaft mixer herein, the frame includes one or more attachment brackets. Optionally, when the twin shaft mixer is freestanding, in certain embodiments the twin shaft mixer is mounted by the one or more attachment brackets to a vehicle. In certain embodiments, the twin shaft mixer is mounted to instillation equipment by the one or more attachment brackets. In certain embodiments, the twin shaft mixer is mounted on an intermediate machine, wherein the intermediate machine is attached to the vehicle and/or instillation equipment. In some embodiments, the twin shaft mixer can be mounted by the one or more attachment brackets to a vehicle in a configuration that allows the twin shaft mixer to be rotated or folded into a position favorable for transport on the vehicle. Another benefit of such embodiments is the attachment of the twin shaft mixer to a mobile continuous delivery system that uses a continuous method of delivery, or another method of delivery of construction materials. Considering the compact and lightweight attributes of embodiments of the twin shaft mixer herein, such embodiments can allow mixing of materials while the delivery vehicle is moving, and the delivery of the materials, including curable composites such as concrete or asphalt, directly to the point of instillation, or directly into instillation equipment for instillation. Such embodiments can provide a benefit of allowing the supply of low slump or high slump construction materials to the delivery location, reducing the in transit degradation that is normally experienced in the construction industry. Such embodiments can make it possible to deliver and feed instillation equipment, such as paving machines, with materials such as asphalt and concrete, at speeds previously unattainable.

Embodiments of Methods of Mixing a Curable Composite

Embodiments herein disclose methods of mixing a curable composite. In an embodiment, such a method includes providing a twin shaft mixer according to embodiments herein. In an embodiment, such a twin shaft mixer includes a frame formed of a rigid material, wherein the frame includes a dual mixing support structure and a sheath support structure; two mixing shafts, wherein an entry end and an exit end of the mixing shafts are supported by the dual mixing support structure; a sheath formed of a flexible material, wherein the sheath includes a top portion and a bottom portion, and the sheath forms a mixing chamber around and along a length of the two mixing shafts; wherein the top portion and the bottom portion of the sheath are attached to the sheath support structure, and wherein the mixing shafts include at least one blade having an outer edge.

Embodiments of methods herein include loading one or more components of a curable composite into an entry end of the twin shaft mixer; forming a curable composite by turning the two mixing shafts at a mixing shaft rotation speed; and dispensing the curable composite to a point of delivery. Embodiments of the twin shaft mixer herein can provide a benefit of allowing the use of increased speeds of the mixing shafts. By using a higher dynamic energy, more shear force can be applied to the mixing surfaces in the mixing chamber, thus facilitating greater mixing of the construction materials. By increasing the rotational speeds of the mixing shafts, the transient rate of construction materials from their entry into and exit from the mixing chamber can be reduced, ultimately increasing the rate of material flow, and thus increasing the capacity of the twin shaft mixer in a compact and lightweight design. In certain embodiments of methods herein, the mixing shaft rotation speed is from about 50 rpm to about 400 rpm. In certain embodiments of methods herein, the mixing shaft rotation speed is from about 60 rpm to about 350 rpm. In certain embodiments of methods herein, the mixing shaft rotation speed is from about 70 rpm to about 300 rpm.

Certain embodiments of methods herein include dispensing the curable composite at a dispensing rate of from about 10 metric tons per hour to about 500 metric tons per hour. Certain embodiments include dispensing the curable composite at a dispensing rate of from about 40 metric tons per hour to about 450 metric tons per hour. Certain embodiments include dispensing the curable composite at a dispensing rate of from about 50 metric tons per hour to about 400 metric tons per hour.

In certain embodiments of methods herein, the curable composite includes a cement composition, an asphalt composition, a cement composition having a slump of from about 0 cm to about 35 cm, a cement composition having an initial setting time of from about 5 minutes to about 200 minutes, or a combination thereof. In certain embodiments, the cement composition has a slump of from about 0 cm to about 30 cm. In certain embodiments, the cement composition has a slump of from about 0 cm to about 25 cm. In certain embodiments, the cement composition has an initial setting time of from about 7 minutes to about 180 minutes; in certain embodiments, the cement composition has an initial setting time of from about 9 minutes to about 160 minutes. In certain embodiments, the mixer is operated at an ambient temperature of from about −40 degrees C. to about 110 degrees C. In certain embodiments, the mixer is operated at an ambient temperature of from about −38 degrees C. to about 100 degrees C. In certain embodiments, the mixer is operated at an ambient temperature of from about −35 degrees C. to about 95 degrees C.

Examples

A twin shaft mixer was constructed with two parallel counter-rotating mixing shafts with abrasion resistant wear paddles, according to the design specifications shown in FIGS. 1-4. The parallel shafts were suspended at each end with bearings attached to end frames shown in FIGS. 1C and 1B. The end frames were connected with a frame section shown in FIG. 2A, 204. The objective was to enclose the mixer shafts within a sheath. In designing the sheath, objectives were to ensure that the sheath did not come into contact with the mixing wear paddles, where sufficient spacing allowed for material to be retained between these surfaces. Another objective was to reduce the rigid surfaces of the framework that would come into contact with the mixing materials, to prevent wear of those surfaces. Another objective was to maintain the sheath materials in tension, and use that tension to shape the sheath materials to form a mixing chamber resembling the shape of the rotating shafts. Another objective was to use a flexible and wear resistant sheath material to allow for shaping and to reduce the surface wear. Another objective was to allow easy access to the inside of the mixing chamber by providing a swing away design or removable design of the sheaths. To satisfy these objectives, a rib style framework was designed to which the sheath could be fastened at various locations, whereby the rib framework would hold the sheath in tension and shape the flexible sheath material. The rib framework would provide resistance, preventing the sheath sections from distorting under the internal pressures created as materials are passed through the mixing chamber. Another objective was to prevent the sheath material from coming into contact with the rib sections, as the flexible sheath will slightly vary in shape as materials are passing by the sheath. Motor mounting locations were created to couple drive motors to the shafts. Mounting points were attached to the mixing chamber, and these mounting points were attached as necessary to the mobile equipment to allow for the twin shaft mixing system to be positioned, folded, moved, and transported.

What is claimed is:

1. A twin shaft mixer comprising:

a frame formed of a rigid material, wherein the frame includes a dual mixing support structure and a sheath support structure;

two mixing shafts, wherein an entry end and an exit end of the mixing shafts are supported by the dual mixing support structure;

a sheath formed of a flexible material, wherein the sheath includes a top portion and a bottom portion, and the sheath forms a mixing chamber around and along a length of the two mixing shafts;

wherein the top portion and the bottom portion of the sheath are attached to the sheath support structure, and wherein the mixing shafts include at least one blade having an outer edge, wherein the sheath support structure includes at least two sheath attachment strips extending along a length of the frame, wherein each sheath attachment strip includes a plurality of sheath attachment points extending along a length of the sheath support structure; and a plurality of rib attachment points extending along the length of the sheath support structure, and a plurality of ribs formed of a rigid material having rib ends and extending along a width of the mixing chamber, wherein the rib ends are attached to the rib attachment points.

2. The twin shaft mixer of claim 1, wherein the flexible material includes a fabric, a rubber material, a conveyor belt material, a multi-ply flexible material, a rubber material having a tensile strength of from about 5 MPa to about 1000 MPa, a rubber material having embedded fibers, or a combination thereof.

3. The twin shaft mixer of claim 1, wherein the rigid material includes steel, or wherein the sheath has a thickness of from about 0.2 cm to about 2.5 cm, or wherein the mixing chamber has a diameter of from about 45 cm to about 200 cm, or the mixing chamber has a length of from about 125 cm to about 400 cm.

4. The twin shaft mixer of claim 1, wherein a ratio of a shortest distance across the mixing chamber to a diameter of the mixing shafts ranges from about 3:1 to about 5:1.

5. The twin shaft mixer of claim 1, further comprising a clearance of from about 0.5 cm to about 20 cm between the outer edge of the at least one mixing blade and an inner surface of the sheath.

6. The twin shaft mixer of claim 1, wherein the top portion and the bottom portion of the sheath include sheath edges, wherein the sheath edges are reversibly attached to the plurality of sheath attachment points with fasteners.

7. The twin shaft mixer of claim 1, wherein the plurality of ribs have a clearance distance between the ribs and the top portion or the bottom portion of the sheath of about 0.1 cm to about 20 cm; and wherein the ribs range in thickness from about 2 cm to about 20 cm and in width from about 0.1 cm to about 2.5 cm.

8. The twin shaft mixer of claim 7, wherein the bottom portion of the sheath is divided into a left bottom section and a right bottom section along a length of the mixing chamber, wherein the rib ends are attached by a hinge to the sheath attachment strips.

9. The twin shaft mixer of claim 8, wherein the ribs are divided into two reversibly attached portions, and wherein the left bottom section and the right bottom section of the sheath include sheath edges reversibly attached to the rib portions; or wherein the ribs include an indentation along a length of the ribs to form a clearance of about 20 cm to about 0.1 cm between the mixing blade outer edges and an inner surface of the sheath.

10. The twin shaft mixer of claim 1, wherein the top sheath portion has a rounded shape; or the sheath top portion is divided into a left top section and a right top section, and wherein the left top section and the right top section are reversibly secured to the frame on at least one end of the mixing chamber.

11. The twin shaft mixer of claim 1, wherein the two mixing shafts are connected to at least one power motor.

12. The twin shaft mixer of claim 11, wherein the at least one power motor includes a hydraulic motor, a direct drive motor, a motor capable of providing from about 5,000 Watts to about 200,000 Watts, or a combination thereof.

13. The twin shaft mixer of claim 1, wherein the frame further comprises one or more attachment brackets, and, optionally, wherein the twin shaft mixer is freestanding, wherein the twin shaft mixer is mounted by the one or more attachment brackets to a vehicle, wherein the twin shaft mixer is mounted to instillation equipment by the one or more attachment brackets, or wherein the twin shaft mixer is mounted on an intermediate machine, wherein the intermediate machine is attached to the vehicle and instillation equipment.

14. A twin shaft mixer comprising:

a frame formed of a rigid material, wherein the frame includes a dual mixing support structure and a sheath support structure;

two mixing shafts, wherein an entry end and an exit end of the mixing shafts are supported by the dual mixing support structure;

a sheath formed of a flexible material, wherein the sheath includes a top portion and a bottom portion, and the sheath forms a mixing chamber around and along a length of the two mixing shafts;

wherein the top portion and the bottom portion of the sheath are attached to the sheath support structure, and wherein the mixing shafts include at least one blade having an outer edge, wherein the sheath support structure includes at least two sheath attachment strips extending along a length of the frame, wherein each sheath attachment strip includes a plurality of sheath attachment points extending along a length of the sheath support structure; and wherein the frame further comprises at least two frame support members extending along the length of the frame, and wherein at the least two sheath attachment strips include a hook portion attached to and extending along the length of the sheath attachment strip, wherein the hook portions are reversibly attachable to the at least two frame support members.

15. A method of mixing a curable composite comprising:

providing a twin shaft mixer, wherein the twin shaft mixer includes a frame formed of a rigid material, wherein the frame includes a dual mixing support structure and a sheath support structure;

two mixing shafts, wherein an entry end and an exit end of the mixing shafts are supported by the dual mixing support structure;

a sheath formed of a flexible material, wherein the sheath includes a top portion and a bottom portion, and the sheath forms a mixing chamber around and along a length of the two mixing shafts;

wherein the top portion and the bottom portion of the sheath are attached to the sheath support structure, and wherein the mixing shafts include at least one blade having an outer edge;

wherein the sheath support structure includes at least two sheath attachment strips extending along a length of the frame, wherein each sheath attachment strip includes a plurality of sheath attachment points extending along a length of the sheath support structure; and a plurality of rib attachment points extending along the length of the sheath support structure, and a plurality of ribs formed of a rigid material having rib ends and extending along a width of the mixing chamber, wherein the rib ends are attached to the rib attachment points;

loading one or more components of a curable composite into an entry end of the twin shaft mixer;

forming a curable composite by turning the two mixing shafts at a mixing shaft rotation speed; and dispensing the curable composite to a point of delivery.

16. The method of claim 15, wherein the mixing shaft rotation speed is from about 50 rpm to about 400 rpm; or comprising dispensing the curable composite at a dispensing rate of from about 10 metric tons per hour to about 500 metric tons per hour.

17. The method of claim 15, wherein the curable composite includes a cement composition, an asphalt composition, a cement composition having a slump of from about 0 cm to about 35 cm, a cement composition having an initial setting time of from about 5 minutes to about 200 minutes, or a combination thereof; or wherein the mixer is operated at an ambient temperature of from about −40 degrees C. to about 110 degrees C.

* * * * *